United States Patent
Shrader

(10) Patent No.: US 9,448,883 B1
(45) Date of Patent: Sep. 20, 2016

(54) SYSTEM AND METHOD FOR ALLOCATING DATA IN MEMORY ARRAY HAVING REGIONS OF VARYING STORAGE RELIABILITY

(71) Applicant: CADENCE DESIGN SYSTEMS, INC., San Jose, CA (US)

(72) Inventor: Steven Shrader, Meridian, ID (US)

(73) Assignee: Cadence Design Systems, Inc., San Jose, CA (US)

( * ) Notice: Subject to any disclaimer, the term of this patent is extended or adjusted under 35 U.S.C. 154(b) by 245 days.

(21) Appl. No.: 13/693,739

(22) Filed: Dec. 4, 2012

(51) Int. Cl.
G06F 12/00 (2006.01)
G06F 11/10 (2006.01)
G06F 12/02 (2006.01)

(52) U.S. Cl.
CPC ....... *G06F 11/1072* (2013.01); *G06F 12/0246* (2013.01)

(58) Field of Classification Search
None
See application file for complete search history.

(56) References Cited

U.S. PATENT DOCUMENTS

| | | | | |
|---|---|---|---|---|
| 2002/0124139 A1* | 9/2002 | Baek et al. | ................... | 711/114 |
| 2004/0268019 A1* | 12/2004 | Kobayashi | .......... | G06F 11/1084 711/1 |
| 2006/0224914 A1* | 10/2006 | Blaum | ................ | G06F 11/1076 714/6.13 |
| 2008/0126676 A1* | 5/2008 | Li et al. | ........................ | 711/103 |
| 2008/0270651 A1* | 10/2008 | Kreiner et al. | ................ | 710/106 |
| 2009/0204758 A1* | 8/2009 | Luning | ......................... | 711/114 |
| 2010/0262773 A1* | 10/2010 | Borchers et al. | ............. | 711/114 |
| 2010/0281207 A1* | 11/2010 | Miller et al. | ................... | 711/103 |
| 2011/0040932 A1* | 2/2011 | Frost et al. | ................... | 711/103 |
| 2011/0209028 A1* | 8/2011 | Post et al. | ..................... | 714/758 |
| 2011/0289267 A1* | 11/2011 | Flynn et al. | .................. | 711/103 |
| 2012/0005402 A1* | 1/2012 | Yamamoto et al. | .......... | 711/103 |
| 2012/0030408 A1* | 2/2012 | Flynn et al. | .................. | 711/102 |
| 2012/0059978 A1* | 3/2012 | Rosenband et al. | .......... | 711/103 |
| 2012/0079318 A1* | 3/2012 | Colgrove et al. | ............ | 714/6.22 |
| 2012/0137066 A1* | 5/2012 | Nolterieke et al. | ........... | 711/114 |
| 2012/0304039 A1* | 11/2012 | Peterson | ................. | G06F 11/10 714/773 |

\* cited by examiner

*Primary Examiner* — Midys Rojas
*Assistant Examiner* — Tasnima Matin
(74) *Attorney, Agent, or Firm* — Rosenberg, Klein & Lee

(57) ABSTRACT

A system and method are provided for efficient allocation of data in a memory array having regions of varying storage reliability. Storage locations for bands of data are selectively allocated in a manner which evenly distributes the probability of error in the data when stored in the memory array in spite of the varying storage reliability. A distribution controller is provided to effect such distribution of data to maintain a collective error rate of each data band within a preselected or predetermined range. The system and method also generally provide for storing at least a first and a second data band in different corresponding sets of storage channels. The system and method also generally provide for at least one of the data bands being stored in regions of differing reliability across the set of storage channels therefor.

28 Claims, 11 Drawing Sheets

| | | | | | |
|---|---|---|---|---|---|
| 13 | 41 | 48 | 53 | 56 | |
| 12 | 37 | 45 | 51 | 55 | |
| 11 | 33 | 42 | 49 | 54 | 12 |
| 10 | 29 | 38 | 46 | 52 | 11 |
| 9 | 25 | 34 | 43 | 50 | 10 |
| 8 | 21 | 30 | 39 | 47 | 9 |
| 7 | 17 | 26 | 35 | 44 | 8 |
| 6 | 13 | 22 | 31 | 40 | 7 |
| 5 | 10 | 18 | 27 | 36 | 6 |
| 4 | 7 | 14 | 23 | 32 | 5 |
| 3 | 5 | 11 | 19 | 28 | 4 |
| 2 | 3 | 8 | 15 | 24 | 3 |
| 1 | 2 | 6 | 12 | 20 | 2 |
| 0 | 1 | 4 | 9 | 16 | 1 |
| | 0 | 1 | 2 | 3 | P |

Pages / Devices

FIG.7

SYSTEM AND METHOD FOR ALLOCATING DATA IN MEMORY ARRAY HAVING REGIONS OF VARYING STORAGE RELIABILITY

The subject system and method are generally directed to the optimal storage of data in a memory array having regions of varying storage reliability. More specifically, the subject system and method are directed to selectively allocating storage locations for data in a manner which evenly distributes the probability of error in the data when stored in a memory array having storage portions characterized by unevenly distributed error rate. The subject system and method generally provide for a distribution controller selectively distributing data bands over a plurality of storage channels or devices to maintain a collective error rate of each data band within a preselected limit or range. The subject system and method also generally provide for storing at least a first and a second data band in different corresponding sets of storage channels. Data bands of different lengths are provided which may be distributed in non-contiguous page arrangements throughout the memory array. A given data band may be stored in regions of differing reliability across the set of storage channels therefor.

As demand for enterprise network services, web services, cloud storage, and a connected enterprise exponentially increase, storage capacity, reliability, speed, and energy efficiency continue to exponentially increase as well. Conventional redundant arrays of inexpensive disks (RAID) may provide some measure of reliability, parallelism, and amount of storage—however, such measures have substantial shortcomings.

Establishing and maintaining an array of numerous disks, each disk having several physical platters rotating at high speeds, oftentimes up to 10,000 revolutions per minute (RPM) contained in a data center, drawing massive amounts of energy, generating heat, noise, and the like, becomes very expensive in terms of hardware, power, cooling, noise suppression, maintenance, and the like. It is seen that any assembly involving moving parts will generate friction, waste heat, noise, and wear and will eventually encounter mechanical failure. Arraying together tens to hundreds of these rotating media disks will inevitably lead to failure of at least one disk relatively quickly. Indeed, such arrays of inexpensive disks will relatively frequently require replacements of disk members and measures for combating the loss of disks, the resultant loss of data, and system degradation/downtime whilst regenerating corrupt data and replacing the damaged disks.

Such measures for mitigating or ameliorating errors and hardware loss must take into account the speed and the degradation of overall system performance while implementing such measures. Therefore, such disks are generally being replaced with solid state-type storage devices without moving parts to form large arrays of, for example, flash devices, such as NAND flash, NOR flash, and the like. Such flash devices offer a host of benefits such as no moving parts, a reduced likelihood of physical or mechanical failure, a reduced physical geometry, a reduction in waste heat generation, a reduction in power usage, and the like. However, such flash devices have a number of peculiarities and complications such as an uneven distribution of error along portions of the flash devices.

One major cause of errors in such flash memory devices are quantum phenomena, such as charge migration. Generally, each flash device is composed of a plurality of physical blocks, each block is generally composed of a plurality of pages. The pages in each block are generally only writable in a sequential manner—meaning, that a first page must be written before a second, third, fourth page and the like. The likelihood of error in a first page is very low, and as pages are sequentially written, a charge accumulates throughout the pages. Such accumulated charge amongst the pages in a block of a flash device may have a negative impact on a subsequent page of the same block within the flash device. Generally, each block has 256 pages (page 0 to 255). By the time that a $254^{th}$ page is written, for example, 253 previous pages containing an accumulated charge representing data, may, in aggregate, affect the charges toward the end of the block, such as pages 253-255. Thus, it is seen that the ultimate page, page 255, and the penultimate page, page 254 may have extreme likelihood of error or error rates, sometimes reaching as high as an order of magnitude higher error rate than the primary pages such as page 0 or 1.

While conventional RAID approaches sought to write promiscuously to all disks, channels, or devices concurrently in a stripe of information, such as across a first, second, third, and fourth device in a four device array, all starting at a page 0 or block 0 thereof, such approach would be less than optimal for solid state disks. Such sub-optimal result is due to the accumulated charge and quantum tunneling or charge migration problems encountered in solid state disks such as flash devices. A page within a flash device is generally implemented as a field effect transistor (FET) having two gates. The second gate within the flash memory page is a floating gate which is isolated from electrical contact by an insulative or dielectric layer. When the accumulated charge in adjacent pages reaches certain levels, the charge stored within the floating gate (the data value stored therein) may be affected by the accumulated charge in the preceding pages. Such effect may create a potential difference large enough to change the value or charge stored in the floating gate of the later pages. Thereby, if a standard RAID writing scheme with a blind promiscuous write across all page 0's of all of the channels or devices of the disks in the array were to be performed, a less than ideal situation would arise where all of the page 0 data storage containers (having virtually non-existent error rates) would be clumped together. Such homogenous clumping of error rate which would be less than ideal in allocating parity data or error correcting code (ECC) data and probability of error.

While the first stripe of data across all of the page 0's of all of the devices would be almost guaranteed to be error-free, later, succeeding, writes to, for example, pages 255, 254, 253, and the like, in each block, across all of the devices would be almost guaranteed to contain a plurality of errors. Such errors when clumped together would most assuredly outstrip even the most robust of error correction schemes enacted. Modern error correcting codes generally store a portion of redundant data to enable the recreation of the original data in the event of a loss of a few pieces of the original information. Where only one error or two errors are encountered in a stripe across the RAID devices, the parity or ECC data may regenerate the erroneous data as if it was never lost.

The earliest written pages (due to their high reliability) would have almost no need for error correcting codes or parity data and thus a one-size-fits-all ECC scheme would result in inefficiencies. Additionally, the likelihood of multiple errors in each stripe of the later written pages would be almost guaranteed statistically and thus would require a very robust, space consuming, expensive parity or ECC data for these stripes of unreliable pages. While it is possible with ECC codes that an ECC may be constructed to correct these later pages during their expected life time. However, all pages would carry the same error correction burden which means that the entire block would have a large amount of ECC storage lowering the capacity of the system. If the ECC is designed for the last two pages of the block with the tenfold error rate, then all pages get the same error rate overhead which may also be tenfold. Such solution would clearly be inefficient considering the low error rate of the pimary page and other early pages in each block.

Therefore, measures for skewing, offsetting, or creating diagonal stripes, the stripes being of a disparately or asymmetrically distributed write pattern across a selective plurality of channels would enable the effective heterogeneous distribution or allocation of error. Thereby, each diagonal stripe set, composite writing band, or data band (used interchangeably herein generally as a stripe set with page offsets to lower the likelihood of RAID recovery failure) may be defined with a predetermined collective statistical likelihood of error and may be more easily anticipated. ECC data may then be more regularly applied to ensure the reliability and consistency of the data stored thereto.

Such measures have heretofore been unobtainable due in part to the fact that each page in a block of a flash device is only writable in a sequential manner. Therefore, a scattered writing of data in such a distributed, offset, or asymmetric-type allocation has heretofore been unachievable as each page of each block must be sequentially written. In other words, page 0 must be written before page 1, which must be written before page 2, and the like- and page 255 must be written last.

There is therefore a need for a system and method for allocating errors in a memory array having unevenly distributed error array.

SUMMARY OF THE INVENTION

A distribution controller is provided for allocating bands of data in a memory array having unevenly distributed error rate to thereby distribute likelihood of error within a predetermined range to allow for effective parity measures for each band. Data bands are thereby formed to have an equalized collective error rate thereamong.

A method for allocating data storage across a memory array having unevenly distributed regions of reliability includes establishing a memory array defined by a plurality of storage channels. Each storage channel is characterized by storage regions of varying data storage reliability disposed therealong. A distribution controller coupled to the memory array is established for selectively assigning storage locations for a plurality of data bands to be stored in the memory array. The distribution controller is actuated to selectively allocate portions of each data band across a corresponding set of storage channels. The distribution controller assigns the set of storage channels to maintain for each data band a collective error rate within a preselected range. At least a first and a second of the data bands are thereby stored in different corresponding sets of storage channels.

A method for allocating data storage across a memory array having unevenly distributed regions of reliability includes establishing a memory array defined by a plurality of storage channels. Each storage channel is characterized by storage regions of varying data storage reliability disposed therealong. A distribution controller coupled to the memory array is established for selectively assigning storage locations for a plurality of data bands to be stored in the memory array. The distribution controller is actuated to selectively allocate portions of each data band across a corresponding set of storage channels. The distribution controller assigns the set of storage channels to thereby maintain for each data band a collective error rate within a preselected range. At least one of the data bands are thereby stored in regions of differing reliability across the set of storage channels therefor.

A system for allocating data storage across a memory array having unevenly distributed regions of reliability includes a memory array defined by a plurality of storage channels. Each storage channel is characterized by regions varying in data storage reliability therein. A distribution controller is coupled to the memory array. The distribution controller receives data to be stored and selectively assigns storage locations for a plurality of data bands to be stored in the memory array. Each data band is distributed across a corresponding set of storage channels. The distribution controller selectively distributes the data bands over the storage channels to maintain a collective error rate of each data band within a preselected range. At least a first and a second of the data bands are thereby stored in different corresponding sets of storage devices.

A system for allocating data storage across a memory array having unevenly distributed regions of reliability includes a memory array defined by a plurality of storage channels. Each storage channel is characterized by regions varying in data storage reliability therein. A distribution controller is coupled to the memory array. The distribution controller receives data to be stored and selectively assigns storage locations for a plurality of data bands to be stored in the memory array. Each data band is distributed across a corresponding set of storage channels. The distribution controller selectively distributes the data bands over the storage channels to maintain a collective error rate of each data band within a preselected range. At least one of the data bands being thereby stored in regions of differing reliability across the set of storage channels therefor.

Additional aspects and details will be set forth in part in the Description which follows, and, in part, will be apparent from the Description and Figures.

BRIEF DESCRIPTION OF THE DRAWINGS

FIG. 7 is a simplified writing sequence chart illustrating exemplary data bands in accordance with an exemplary configuration of the present invention;

DETAILED DESCRIPTION OF THE PREFERRED EMBODIMENTS

The subject system and method distribute bands of data written across a memory array where the array has an unevenly distributed storage reliability. The data bands are written in such manner that each data band has a substantially equalized likelihood of storage errors occurring therein. While the array may have storage regions of greatly differing reliability, the data bands written thereto have been selectively allocated therein to maintain the likelihood of error for a given band within a manageable threshold such that parity or error correction measures may suitably address such errors. The subject system and method may be thought of as providing measures for data bucketing. Rather than utilizing a strict uniform spatial arrangement of data bands, perhaps in a horizontal stripe across all channels, data bands may be defined to be offset around different regions of reliabiltiy of the memory array to balance a collective error rate of each band to more closely match a predetermined error correction scheme. Thereby, data integrity is furthered and system interruption due to data regeneration is minimized.

One example of the system and method seeks to provide measures for allocating probability of errors in a memory array having unevenly distributed error rate. A distribution controller is provided to receive data to be stored from a host and selectively allocate that data along the memory array having the unevenly distributed error rate. Sets of channels or disks are selectively and asymmetrically utilized for writing data bands. Thereby, the likelihood or probability of error throughout the memory array is evenly distributed by balancing error rates throughout each data band to be correctable by an error correcting code (ECC).

Figure 1:
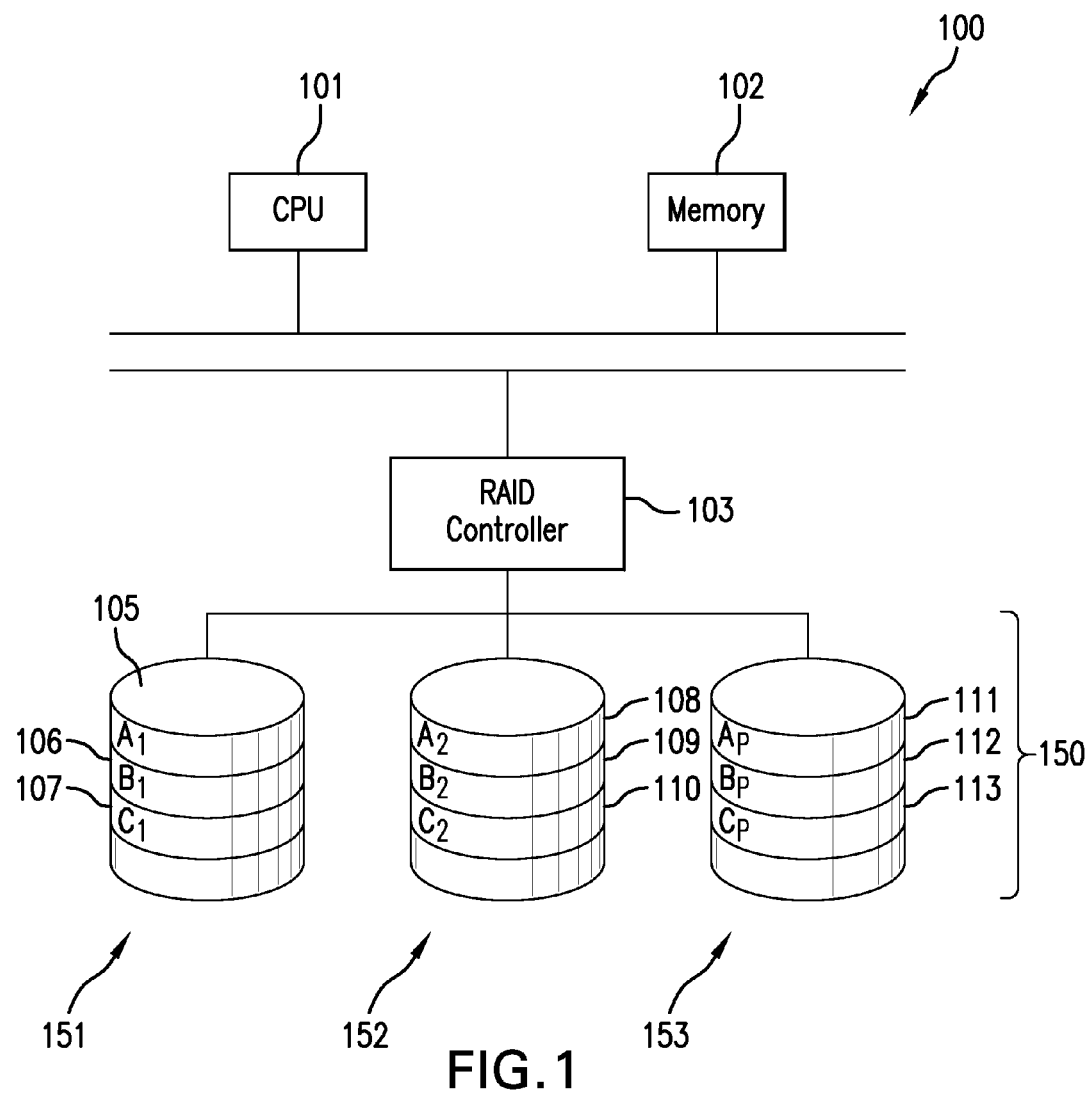
FIG. 1 is a block diagram illustrating an exemplary interconnection of components in a system for implementing an exemplary configuration of the present invention.

As seen in the illustrative block diagram of FIG. 1, a system 100 for writing data in a memory array is provided. A central processing unit (CPU) 101 is coupled by a bus or other such measures to a memory 102 which may be a static random access memory (SRAM), a dynamic random access memory (DRAM), or the like. Additionally, a redundant array of inexpensive disks (RAID) 103 is also coupled to the CPU 101 and memory 102. The RAID controller 103 allows a memory array 150 (which may, for example, be a solid state disk (SSD) arraying a plurality of flash devices therein) to be seen as one logical disk or storage device to the CPU 101 and programs running thereon such as an operating system, storage system, a file server, and the like. Thereby, a plurality of flash devices 151, 152, and 153 may be utilized as one logical disk 150 by the CPU 101 though having the benefits of a plurality of disks. A number of benefits are provided such as, for example, an at least partial aggregation of the total storage volume of the number of disks, a division of writing operations such that writes to the RAID are performed with a degree of parallelism not normally possible with a single disk. Additionally, a degree of error detection and correction are provided as well with a degree of duplication of data using measures known to one of skill in the art such as a parity portion, checksum, secure hash, digest, error correcting codes (ECC), and the like.

Rather than a spinning disk media, flash devices may be substituted for disks 151, 152, and/or 153. Thereby, in some respects, due to aggregration, a faster speed is provided as latency is not encountered rotating the disks to seek the data requested. Power savings are realized as there are no moving parts and the spinning of the disk does not need to be initiated, maintained, or changed periodically. Additional heat, power, and cooling savings are realized as no moving parts are utilized, cooling fans may be omitted, and the like. Additionally, mean time between failure (MTBF) is greatly increased as the omission of moving parts and heat dissipation measures, such as fans, greatly reduces the likelihood of hardware mechanical failure. Speed benefits are greatly increased when the flash devices are arrayed together to provide parallel Input and Output.

A general operation of a standard RAID system may involve a CPU 101 executing a program or an operating system temporarily residing in memory 102 during execution thereof. Such program or operating system may periodically request writing or reading transactions from the RAID controller 103 which it sees as a single logical disk 150. The RAID controller 103 accepts requests from the CPU 101 or a program executing thereon and re-interprets the request for a specific location on a single logical disk to the actual physical location(s) such as disk 151, 152, and/or 153 to thereby appropriately locate the desired data or storage portion to write data thereto or read therefrom. In the instant configuration, it is seen that during a write operation, the CPU 101 may provide a block, frame, packet, or a segment of data which may be greater than an individual disk or a portion of the disk. The RAID controller 103, in a write operation, may then write in a striping pattern across the disks for substantially parallel or concurrent writing thereto. For example, a CPU 101 may provide a portion of data $A_T$ to be stored where $A_T$ is equal to a summation of data portions $A_1$ 105 and $A_2$ 108. The RAID controller 103 may then accept the data $A_T$ and break it into the two portions $A_1$ and $A_2$ for concurrent writing to both the first disk 151 and the second disk 152. The RAID controller 103 may also generate a parity portion $A_P$ 111 which may be written concurrently as well. The RAID controller may concurrently write the data $A_1$ 105, $A_2$ 108, and the parity data $A_P$ 111 to the three disks 151, 152, and 153 respectively. Such concurrent writing to all three disks 151, 152, and 153 effectively reduces the writing time of the data $A_T$ by half and yet, potentially, doubles the security of the data by providing a parity portion $A_P$ 111.

A second portion, a totality of B data may be provided by CPU 101 to the RAID controller 103 where the data distribution module 104 may then write portions of the totality of the B data ($B_1$, $B_2$, and a parity $B_P$) to the three disks 151, 152, and 153 concurrently. The RAID controller 103 may receive yet another write request for a chunk of data C. This C data portion may be split into subsets $C_1$ 107, $C_2$ 110, and a generated parity portion $C_P$ 113 to be concurrently written to the three disks at their third respective storage portions thereof. Thereby, $C_1$ 107, $C_2$ 110, and $C_P$ 113 are each written to the third storage portion of each of the respective disks 151, 152, and 153. Thereby, upon writing each of the three portions of data, the disks 151, 152, and 153 may all be symmetrically stored to, such that the first three storage portions of each are occupied. Such a configuration may be considered a RAID level 4 as a dedicated parity device 153 is utilized. A RAID level 5 distributes parity data to all disks rather than a dedicated one.

Such approach of writing symmetrically to all flash devices in a concurrent fashion to the same portions or pages of each of the devices in a write operation has many disadvantages. A first disadvantage is a poor distribution of expected or likely error. With regard to flash devices, the primary storage portions utilized for data segments 105, 108, and 111 are all the least likely to encounter error. Clumping or grouping all three of the least likely error portions together does not lead to a balanced distribution of likely error. The parity portion $A_P$ 111 is largely unnecessary and inefficient as the likelihood of error in either data section 105 or 108 is very low. Additionally, the data portions 107 and 110 are the most likely to have errors and therefore utilizing the one size fits all parity seen in, for example, $C_P$ 113 is highly inefficient as the write operations 107 and 110 are likely to require much more parity or error correcting protection than the portions 105 and 108. Moreover, parity portion $C_P$ 113 itself is very likely to have errors as well.

Figure 2:
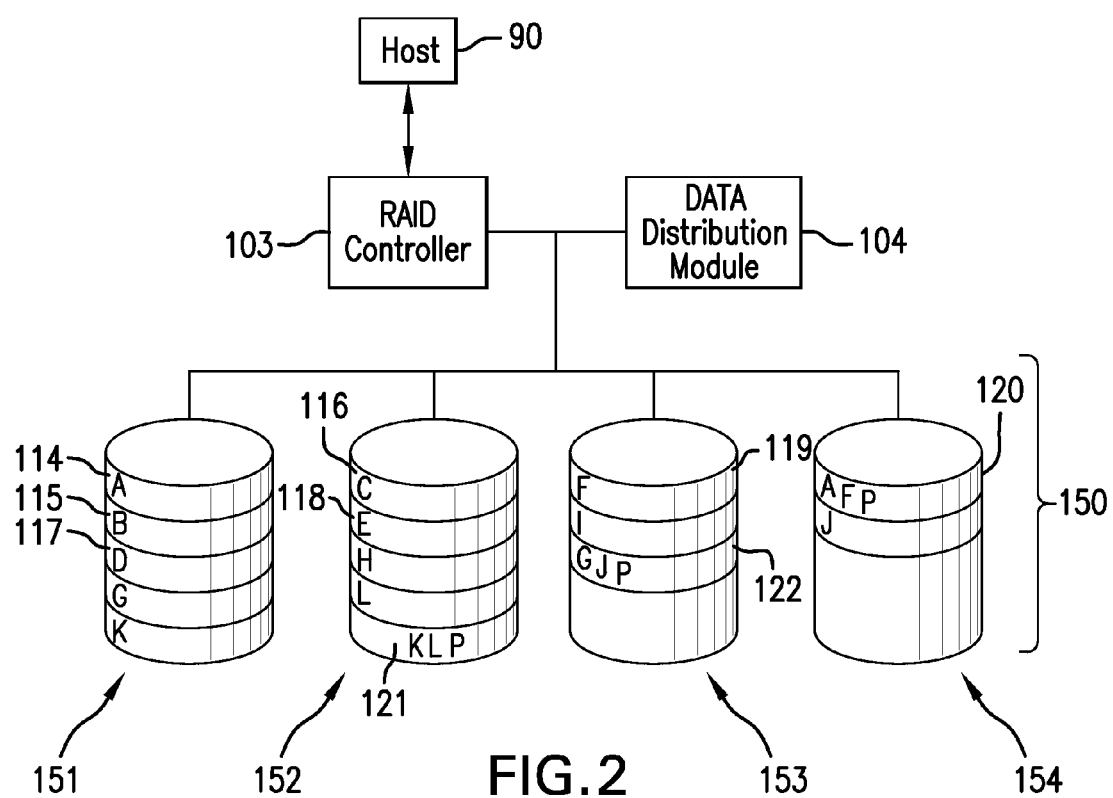
FIG. 2 is another block diagram illustrating another exemplary interconnection of components in a system for implementing an exemplary configuration of the present invention.

As seen in FIG. 2, a RAID controller 103 is coupled to a data distribution module 104 and a host 90. Such arrangement may involve two separate modules: the RAID controller 103 and the data distribution module 104. Alternatively, the data distribution module 104 is incorporated into the RAID controller 103. Any such arrangement as would be known to one of skill in the art may be employed. In FIG. 2, it is seen that an offset, diagonal, or asymmetrical writing of data bands to the memory array 150 is utilized. RAID controller 103 may receive a stream of data segments from a host 90. The host 90 may provide data in blocks of 4 kilobytes or any other such portion or formatting as may be suitable for the system or host 90 to utilize. Host 90 provides data segments, packets, frames, or portions to the RAID controller 103 for writing to the disks or channels 150. The RAID controller 103 may then pass those data segments to be written to the data distribution module 104 which modifies an envelope of each segment or, alternatively, appends an envelope to a segment to write an address within the memory array to each segment.

Data distribution module 104 selectively addresses each of the incoming segments, packets, frames, or the like by applying an address scheme such as, for example: "channel 0, block 0, page 0" in each of the segments received from the host 90. Data distribution module 104 then passes on these addressed data packets to a de-multiplexer (not shown in interest of brevity) for de-multiplexing of the data stream to route each of the packets to their respective destination disk 151-154 responsive to the addressing of the data distribution module 104.

In a first example, a stream of data is provided from a host 90 which arrives at the data distribution module 104 which is a field programmable data array (FPGA). Alternatively, the data distribution module 104 is an application specific integrated circuit (ASIC), a microcontroller, a system on chip (SOC) or the like. Such data distribution module 104 has a flash memory, an EEPROM, or the like to store a firmware, ROM, or dynamically changeable instruction set thereof. The firmware, ROM, or instruction set for the data distribution module 104 implements a staggered, asymmetrical, offset, or diagonal, writing pattern to the memory array 150.

Such a writing pattern is preferably implemented by selectively choosing a set of volumes, channels, or disks for each striped write operation or data band. For example, for a first write operation, disks 151 and 154 are used, whereas, in a second writing operation, disks 151 and 152 are used. Thereby, a non-symmetric, offset, and/or diagonal writing pattern is applied disparately to sets of the disks 151-154 to thereby distribute data with a more beneficially allocated likelihood of error amongst the disks.

As a very simplified write sequence example, a first writing operation includes a data portion A 114 being written to a first disk 151. In a second writing operation, a data portion B 115 is written to the same disk 151. After the second writing operation, where data portion B 115 has been written, it is now seen that the utilization of the individual disks 151, 152, 153, and 154 in memory array 150 are unevenly or asymmetrically utilized. This is apparent as disk 151 has two portions of data A 114 and B 115 written to the first two page portions whereas disk 152, 153, and 154 have not been written to at all.

Alternatively, a plurality of the storage portions of the disks 151-154 are written in one stripe pass or data band which may involve portions A-F 114-119. In the event that portions A-F 114-119 are written in one stripe or data band, then a corresponding parity portion $AF_P$ 120 may be written to a disk 154. In practice, it is seen that a data band may be written to include a plurality of different portions of data or storage portions of disks 151-154. Upon the striped writing of substantive data thereof, a portion 120 $AF_P$ is written as a parity portion or data detection/correction portion 120. In forming the stripe sets or data band to be written, the data distribution module 104 may perform a determination of the likelihood of error of each of the storage portions of the disks 151-154. The data band may thereby be formed according to the collective or summation of the likelihood of error across all of the disks 151-154. The data distribution module 104 seeks to strike a balanced or evenly distributed likelihood of error throughout each of a plurality of data bands written to sets of the disks 151-154. The data distribution module 104 next performs another writing operation or stripe of data including portion G, H, I, J, and a generated parity portion $GJ_P$ 122 calculating the parity of data portions G, H, I, and J. Thereby, the data disks 151-154 are utilized in an asymmetric manner by writing one portion of data, G, H, I, J to one each of disks 151, 152, 153, and 154 and a parity portion in a distributed manner.

Yet another data band includes data portions K and L written to devices 151 and 152, respectively, including a parity portion $KL_P$ 121 also written to device 152. Thereby, an asymmetric or offset write of one data portion to device 151 and two data portions to device 152 may be written. Such offsetting of the disks allows for a staggered or distributed allocation of likelihood of error between the disks to thereby arrive at a more beneficial blend of low probability of error portions with high probability of error portions to thereby meet or stay below an error correcting threshold of an error correcting code such as parity portion $KL_P$ 121, $G_{JP}$ 122, or $AF_P$ 120. Thereby, should an error occur in a data band, the likelihood that the error correcting code or parity portion is able to adequately correct the data loss is maximized.

Figure 3:
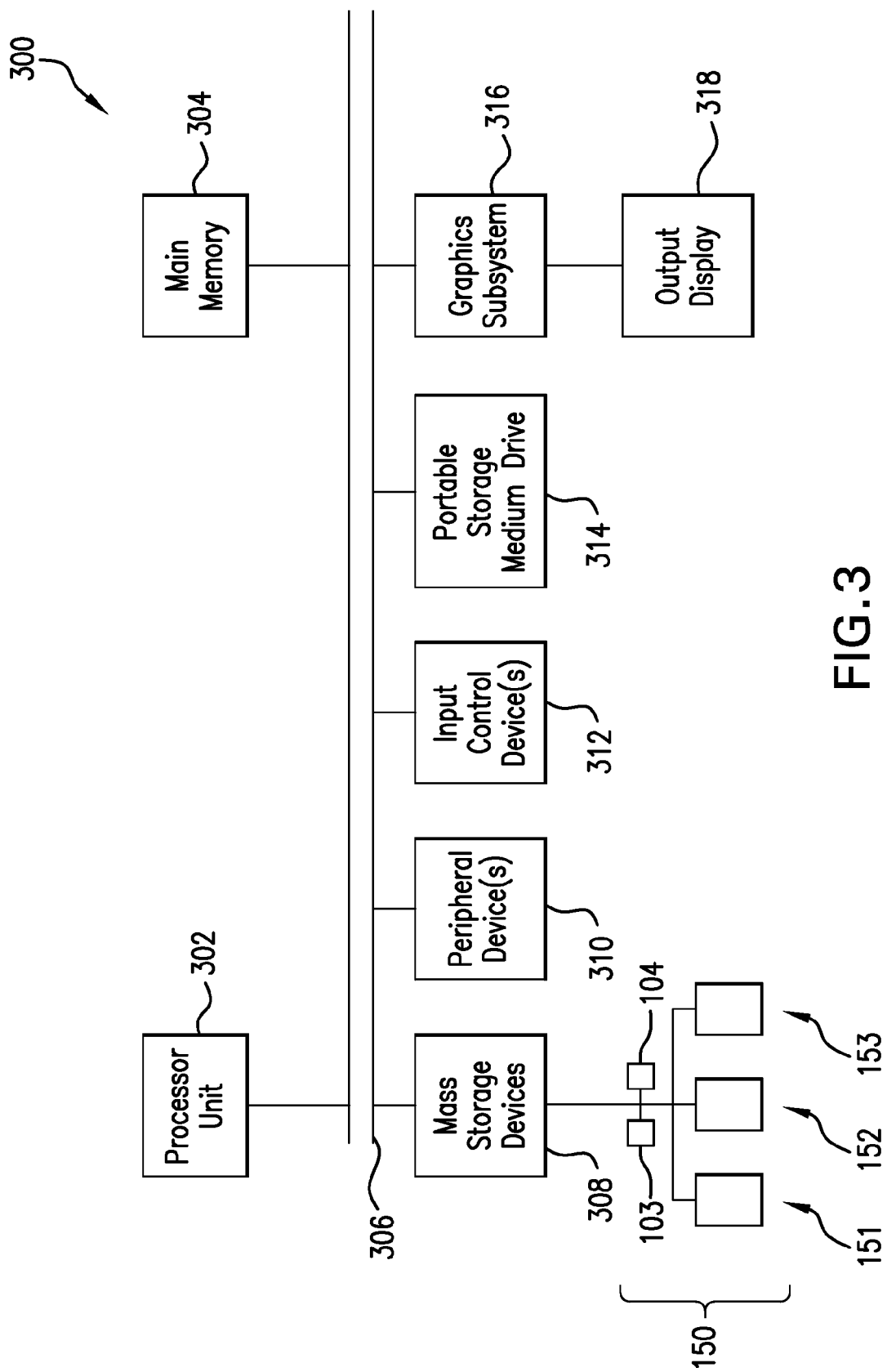
FIG. 3 is a simplified block diagram illustrating an exemplary interconnection of components in a processor-based system for implementing an exemplary configuration of the present invention.

Turning to FIG. 3, a block diagram of a computer system employing the disclosed system and method is illustrated. A computer system 300 contains a processor unit 302, a main or primary memory 304, an interconnect bus 306, a mass storage device 308, peripheral device(s) 310, input control device(s) 312, portable storage device(s) 314, a graphics subsystem 316, and an output display 318, amongst other components. Processor unit 302 may include a single microprocessor or a plurality of microprocessors for configuring computer system 300 as a multi-processor system. Main memory 304 stores, in part, instructions and data to be executed by processor 302. Main memory 304 preferably includes banks of dynamic random access memory (DRAM) as well as high-speed cache memory, such as static random access memory (SRAM) at various levels of the system architecture.

For the purpose of simplicity, the components of computer system 300 are connected via interconnect bus 306. However, computer system 300 may be connected through one or more data transport means. Mass storage device 308, which may be implemented with a magnetic disk drive, an optical disk drive, a solid state device, an attachment to network storage, a RAID arraying any of the above, and the like, is preferably a non-volatile storage device for storing data, databases, and instructions, to be used by processor unit 302. In certain configurations, mass storage device 308 may store portions of the software to load it into main memory 304 or into a firmware of one or both protocol interface devices 320 and 340 and/or lateral communication controller 350. It is seen that Mass storage device 308 is coupled to a raid controller 103 and a data distribution controller 104 which are coupled to a plurality 150 of storage devices 151, 152, and 153.

Portable storage medium drive 314 operates in conjunction with a portable non-volatile storage medium such as a floppy disk, a compact disk read only memory (CD-ROM), or a digital versatile/video disk read only memory (DVD-ROM), to input and output data and code to and from the computer system 300. In one configuration, software portions are stored on such a portable medium, and are input to computer system 300 via portable storage medium drive 314. Peripheral device(s) 310 may include any type of computer support device such as an input/output (I/O) interface, to add additional functionality to computer system 300. For example, peripheral device(s) 310 may include additional network interface cards to interface computer system 300 to additional networks.

Input control device(s) 312 provide a portion of the user interface for a computer system 300 user. Input control device(s) 312 may include an alphanumeric keypad for inputting alphanumeric and other key information; and a cursor control device such as a mouse, a track pad or stylus; or cursor direction keys.

In order to display textual and graphical information, computer system 300 contains graphic subsystem 314 and output display(s) 318. Output display 318 may include a cathode ray tube (CRT) display, liquid crystal display (LCD), plasma display, projector, or the like. Graphic subsystem 316 receives textual and graphical information and processes the information for output to display 318.

In a software implementation, the portions of software for certain measures may include a plurality of computer executable instructions, to be implemented on a computer system. Prior to loading in the computer system or firmware, the software may reside as encoded information on a computer-readable tangible medium such as a magnetic floppy disk, a magnetic tape, CD-ROM, DVD-ROM, flash memory, or any other suitable computer readable medium. Such software may control multiplexors, selectors, field programmable gate arrays (FPGAs), or the like to implement logical control and selectivity features.

In an illustrative implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Figure 4:
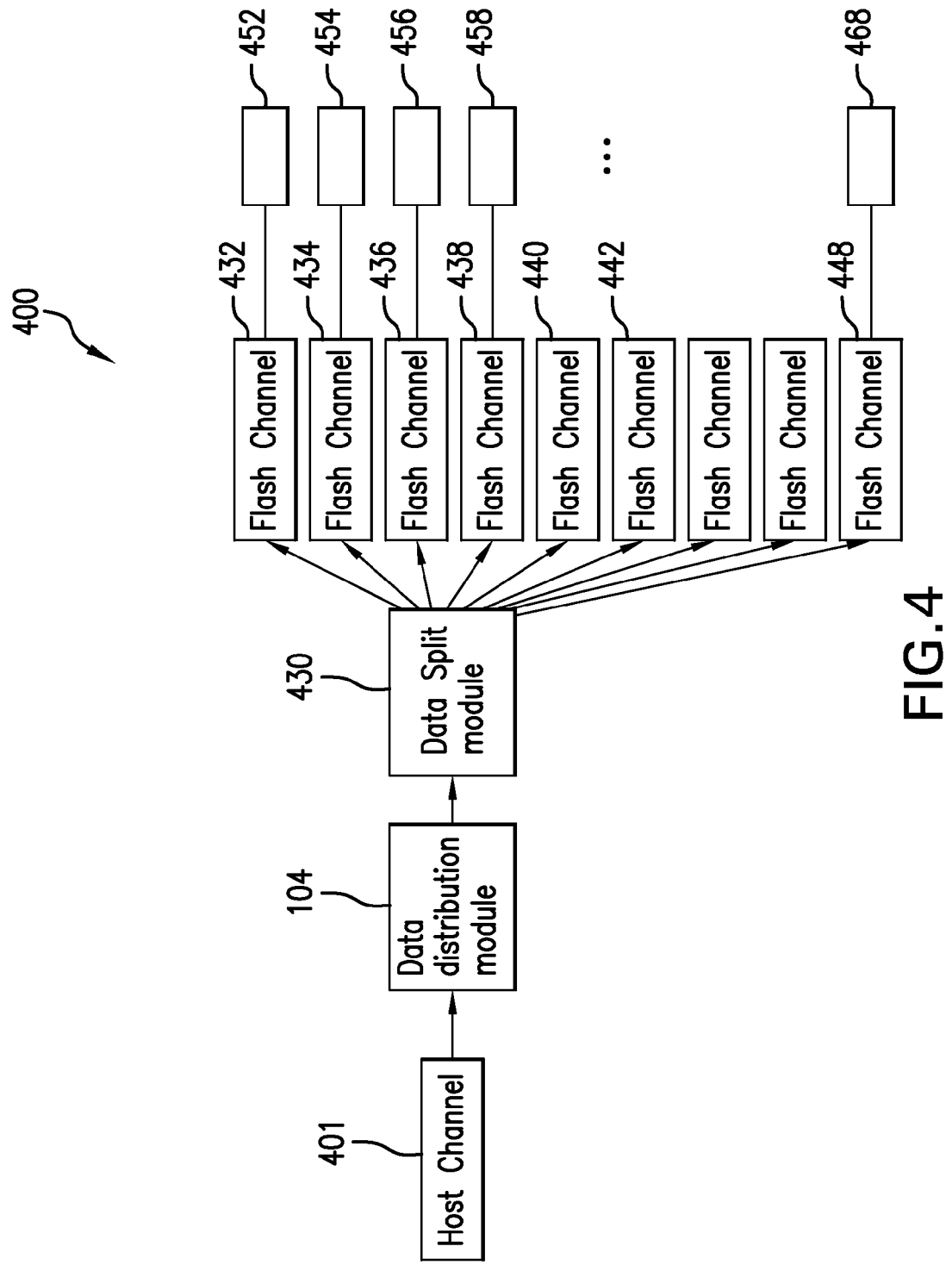
FIG. 4 is another simplified block diagram illustrating another exemplary configuration of the present invention.

As seen in FIG. 4, a system 400 includes a disk data channel 401 (referred to herein as a host channel for simplicity and brevity) such as an integrated drive electronics (IDE), parallel AT attachment (PATA), serial ATA (SATA), external SATA (eSATA), gigabit Ethernet, fiber channel, and the like. However, in some configurations, the host channel exists after the remapping of the host logical block address. The host channel 401 provides an incoming stream of data and also receives an outgoing stream of data from the data distribution module 104. Incoming data from the host channel 401 to be stored is sent from the host channel 401 to the data distribution module 104 where a composite writing data band is formed to selectively distribute the incoming data to the disks in such manner as to evenly allocate or distribute likelihood of error amongst the disks.

As segments of data are received by the data distribution module 104 from the host channel 401, each segment is selectively addressed responsive to an over-arching writing pattern to be applied to the devices. The host channel generally receives 4 kilobytes (KB) pages which are then forwarded on to the data distribution module 104. The data distribution module 104 then selectively addresses each of the 4 kilobyte pages to a set including least one of the flash channels such as 432-448. An exemplary addressing of a packet may be to envelope the packet in an outer addressing envelope containing an address such as, for example, "channel 0, device 0, block 0, page 0." A stream of such addressed packets are then passed to the data splitting module 430 which is preferably a multiplexer, but may be a router, selector, controller, or the like. The data split module 430 then inspects the flash channel address of the incoming data packets and demultiplexes the stream of incoming packets to send each packet to the specified flash channel such as flash channel 432. Flash channel 432 then passes the packet on to the corresponding device 452. A flash controller generally is disposed in a flash device 452. Such controller specifically controls low level writes to the flash media itself.

The flash controller then inspects the remaining address portions such as the block and page portion specified in the envelope and then forwards the data within the packet generally without the envelope to the correct block and page address of the flash device for writing thereto. A succeeding packet is, for example, addressed to a flash channel 1, device 0, block 0, page 0, and this packet would then be demultiplexed at the data split module 430 and routed accordingly to the flash channel 434 for writing to the device 454.

The flash controller disposed in flash device 454 then removes the envelope from the packet, taking care to note the block and page addresses and then selectively writes the substantive data in the packet to the specified block and page number of the flash device 454. Such addressing and writing continues in an uneven manner to thereby offset writes between the flash devices 452-468. Thereby, a blend or distributed allocation of likelihood of error amongst the devices 452-468 is achieved to more closely match an error correcting code pre-established for the arrayed memory devices. Thereby, the reading speed and resiliency to errors in flash channels 432-448 and respectively corresponding devices 452-468 are furthered.

An over-arching writing pattern is preferably predefined in advance according to the physical memory media used and the number of channels or devices. The over-arching writing pattern is stored in the data distribution module 104 as ROM or firmware. Alternatively, the writing pattern may be stored on software residing on the host device 401. Further still, the pattern and associated instructions may be initially stored in a flash memory, but copied to system RAM at initialization thereof for faster access thereto during operation. Such pattern for data includes instructions to shift one page between channels, two pages, three pages, four pages, and the like. The higher the shift, the slower the initial series of write stripes of data bands will generally be. For example, in a shift 1 configuration, a flash channel 432 and a corresponding device 452 are written to once or potentially twice before the flash channel 434 and its corresponding device 454 are written to even once. Extrapolating this pattern throughout the flash channel devices whether there may be 1, 2, 3, . . . n flash channels and corresponding devices, a delay of the shift multiplied times n devices is encountered before the ultimate flash device 468 on channel 448 are even utilized for parallel writing with the other flash channels.

Figure 5:
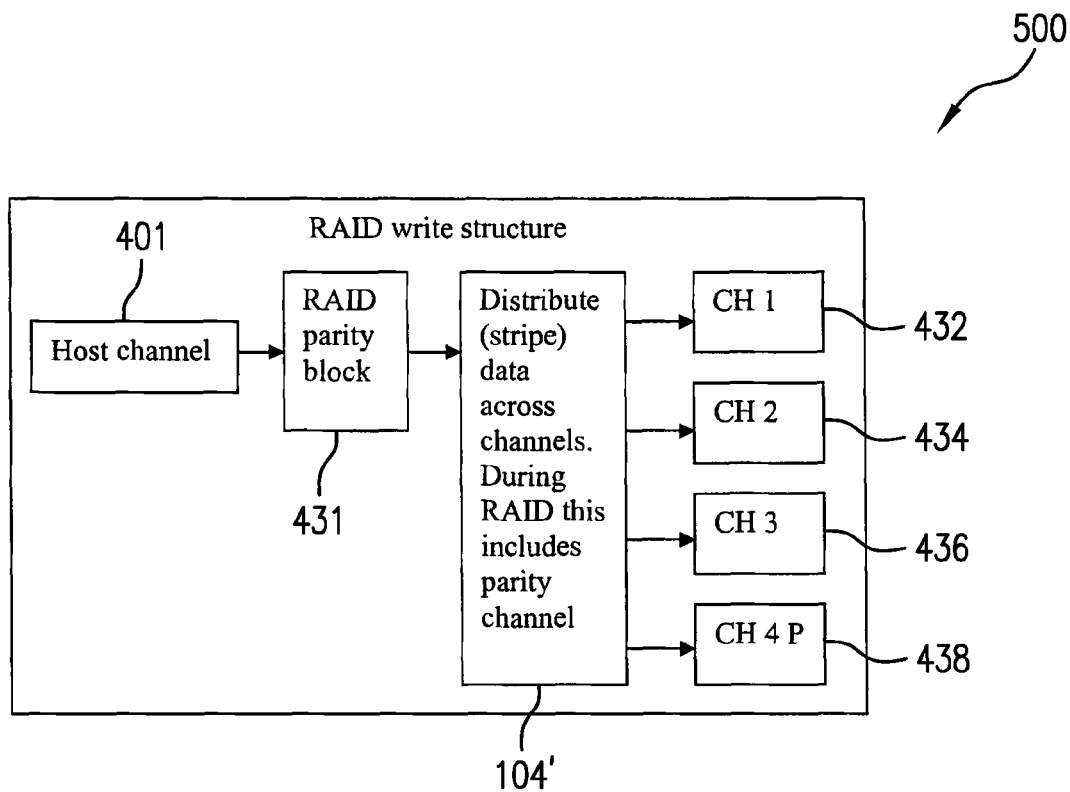
FIG. 5 is a simplified flow diagram illustrating a flow of data and instructions through an exemplary configuration of the present invention.
Figure 6:
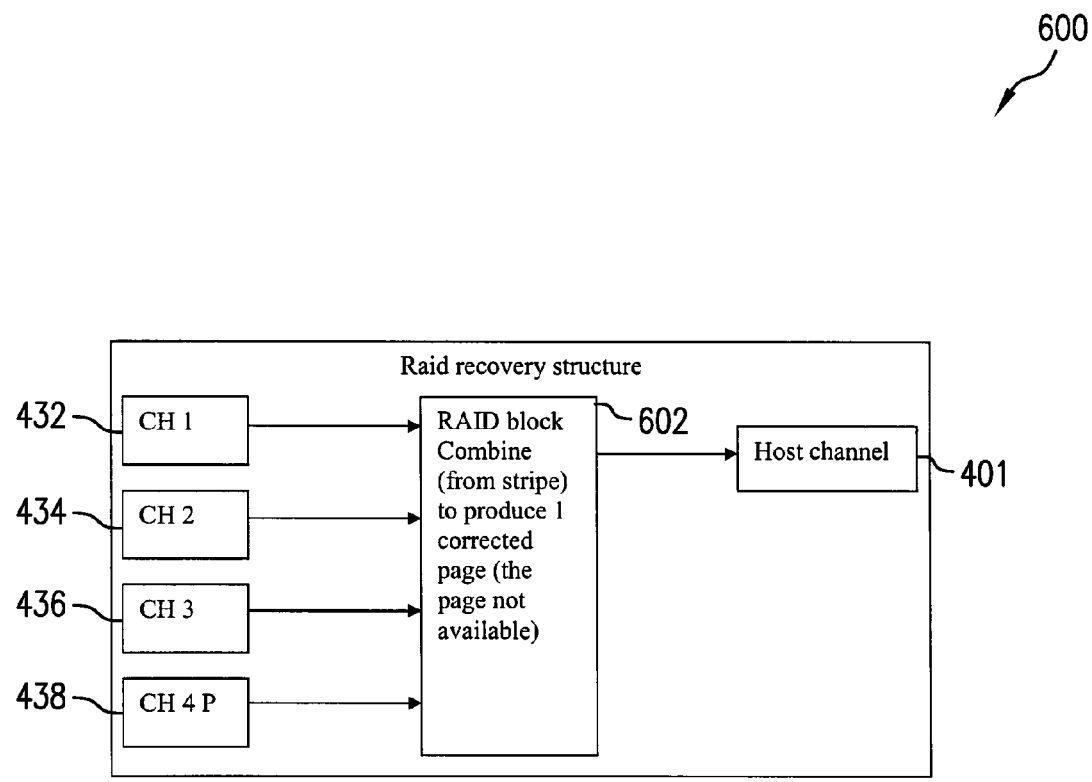
FIG. 6 is another simplified block diagram illustrating an interconnection of components and an exemplary flow of information of instructions through the system in an exemplary configuration of the present invention.

As seen in FIG. 5, incoming data from a host channel 401 is passed to a RAID parity block 431 which configures a parity or error correcting code scheme based upon a stripe length of data across a plurality of disks and the likelihood of error therein. Parity block 431 additionally generates a parity, ECC, or redundant portion for the data to be written. For example, if the disks in the RAID array have not yet been written to and a first page is about to be written, then a low error rate will likely be encountered. As such, a long stripe pattern is formed having quite a few numbers of pages or storage portions thereof. Thereby, a stripe pattern or data band having a relatively large number of portions due to the relatively low collective error rate may be calculated to have a corresponding parity portion generated in accordance therewith. When a file table maintaining a list of write activity indicates that a writing operation is nearing an ending page of a block, then, due to the relatively high error rate thereof, potentially only one or a few page portions will be utilized in the data band and a parity portion will be generated in accordance with that lower number. The substantive data and the parity portion are then passed along from the RAID parity block 431 to the distribution module 104' which includes, in this exemplary configuration, a data splitting module. Thereby, the distribution module 104' selectively addresses where each individual packet of data will be written to on a respective flash device. The multiplexer therein which receives all of the incoming packets demultiplexes that stream of packets and selectively provides each packet to its corresponding addressed device. The distribution and splitting module 104' then selectively sends each addressed packet to the addressed flash device or flash channel 432, 434, 436, and/or 438 as the case may be.

To recover the data written in accord with the error probability allocation measures disclosed herein, the writing process is essentially reversed. The over-arching writing pattern is consulted, which may be, for example, a 2 offset, 3 offset, 4 offset, or n offset as may be suitably chosen based upon the number of flash devices, the likelihood of error, distribution of error rates therein, the needed speed and parallelism of writing to devices, and the acceptability of overhead and delay in initiating individual device offsets by selectively writing to less than the total number of devices, and the like. Such over-arching pattern is evaluated and the pattern which forms the composite writing band or data bands is referenced in the distribution and splitting modules. Thereby, a data joining module which is equal and opposite to the data splitting module 430 (seen in FIG. 4 and incorporated into the distribution module 104') is established. Such data joining module is preferably a multiplexor, though any m to n selector may be utilized.

The data joining module in this instance, however, requests reading operation from each individual flash device controller. The data is thereby recovered from the flash device(s) and is sent to the data joining module which, in this FIG. is not shown, but is incorporated in the RAID block 602, which effectively multiplexes all of the received data from the plurality of flash memory devices. Thereby, data packets coming from the plurality of flash devices 432, 434, 436, and 438 are effectively combined into a single stream of a plurality of data sources. The stream of a plurality of data sources passes through the multiplexer contained in the RAID block 602 which is then retransmitted to the host channel 401 for use in programs executing on the main processor or processors 101 as seen in FIG. 1. Thereby, the host system and programs executing thereon treat the plurality of flash devices as if they were one logical device containing all data in a contiguous manner.

In the event that a portion of data from one or a plurality of devices such as, for example, 432-438 are not available, or the data is corrupted relative to a comparison between a parity or ECC portion, the entirety of the devices 432-438 will generally need to be harnessed to regeneratively restore the portion of data which is either corrupt or missing. Thereby, the devices 432-438 utilize a symmetric function considering the data which is available and the parity data which was generated from the totality of the data to be written to thereby determine the most likely values of data that were originally provided to result in the parity value that is present. Any known error detection or error correction codes or measures may be utilized herein. Regenerating a given data band herein may not use the entirety of the devices in the raid array which may prove beneficial in terms of power as only the disks utilized in a specific data band or composite write band are needed.

As seen in FIG. 7, a write-sequence table is shown. The left—most column lists 14 pages 0-13 (shortened for brevity and simplicity) and 56 data portions sequentially written. In this simplified exemplary configuration, there are 5 flash devices (0-3 and P) on 5 respective channels. P is a parity flash device or channel. A first data band including, for example, data portions 1-8, 10, 13, 17-18, and 21-22, selectively grouped with parity portion 1 are shown. These data portions are written to pages 0-8 of channel 0 and pages 0-2 and 5-6 of channel 1 with the parity portion written to page 0 of channel P. In an actual configuration, care is generally taken to not combine multiple primary pages or page 0s together. A second exemplary data band includes 11-12, 14-16, 19-20, 23-31, and 33-36 coupled with parity portion 2. Notably, data portion 56 (written to channel 3, page 13) which, in this simplified example, may be one of the most unreliable portions, is grouped by itself in its own data band and has parity portion 12 selectively assigned thereto—resulting in a potentially mirrored situation providing the most robust parity. Likely, the most unreliable portion 56 is decoupled from the penultimate unreliable portion 55. Portion 55 similar to portion 56 also has its own parity portion, parity portion 11 providing very robust protection thereto. Portion 53 is coupled with portion 54 and together shares a parity portion 10. Portion 51 is coupled with portion 52 and together share parity portion 9. These, the most unreliable portions are selectively broken up such that neither band contains two of the highest (most unreliable) pages shown.

Figure 8:
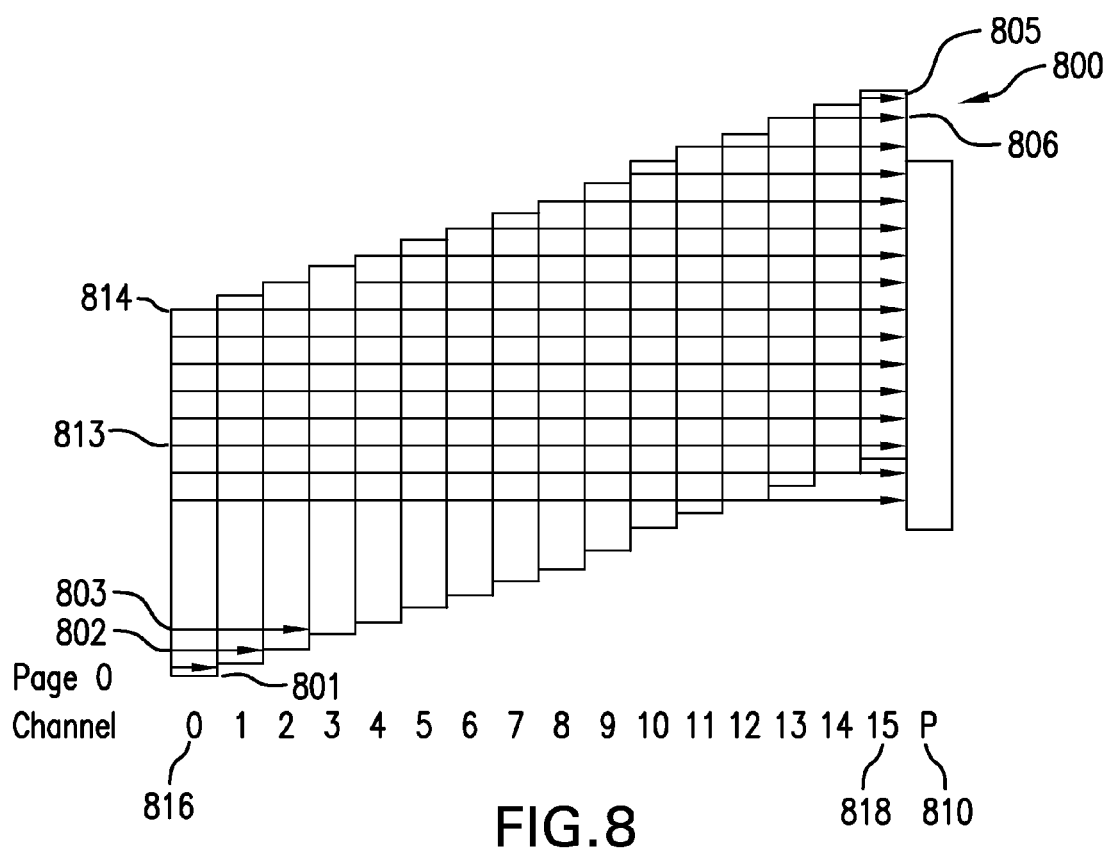
FIG. 8 is a simplified channel offsetting chart illustrating exemplary data bands in accordance with an exemplary configuration of the present invention.

As seen in FIG. 8, an exemplary offset, skewed, diagonal, or asymmetric over-arching writing pattern composed of a plurality of composite writing bands or data bands is shown. In the exemplary configuration shown, a first writing operation 801 may selectively invoke a writing solely to channel 0 (816). Such first write 801 may write merely to the first channel 0 (816) bypassing all other channels 1-15 (818). The first writing operation is merely intended to initialize, offset, or write to channel 0 (816). This data is being written to a primary portion which is reliable, secure, and relatively less error prone portion of the channel 0 (816). Alternatively, this first writing operation 801 may be combined with several other initializing writing operations such as 802 and 803 as statistically, these primary portions thereof have very low probability of error. The error rate in the primary portions towards the beginning of each of the channels 0-15 and including the parity channel (in this case shown as a separate dedicated channel for simplicity and brevity) are generally very low and on the order of $118^{th}$ or approximately one order of magnitude less than the error rate of a higher portion such as portions 250-255. These such primary portion stripe patterns may involving a plurality of writes to the primary portions and may be quite long, containing a relatively large plurality of storage portions biased towards the primary portions of each channel. Such may be utilized collectively in a stripe set or data band for a small fixed portion of parity in the parity channel 810. Thereby, with the very low collective probability of error, a very weak or lightweight correction, detection, or parity portion may be utilized. With successive write operations, more and more channels are utilized such that a greater and greater degree of parallelism is achieved and thereby faster writing is also achieved. A portion of the data bands and writing operations falling between operation 803 and 813 have been omitted for brevity. When the writing cycle starts to approach a write operation 813, it may be seen that all or nearly all of the 0-15 writing channels are being concurrently utilized for writing data to the plurality of flash devices. At this point, it is seen that at write operation 813, while the page number is relatively higher in channel 0, 1, 2, and 3, it is seen that in channels 12, 13, 14, and 15, that the writing operation or stripe 813 occupies the very lowest pages. Therefore, it is seen that while the page number is channel 0 of stripe 813 is relatively high, this is offset by a primary portion of channel 15 in stripe 813. Thereby, the stripe 813 spanning from channel 0 to channel 15 has an evenly allocated or distributed probability of errors which is matched suitably to an ECC or parity portion contained in the parity channel 810. Thereby, chances of errors can be adequately addressed and managed with a reasonably robust parity portion.

Figure 8A:
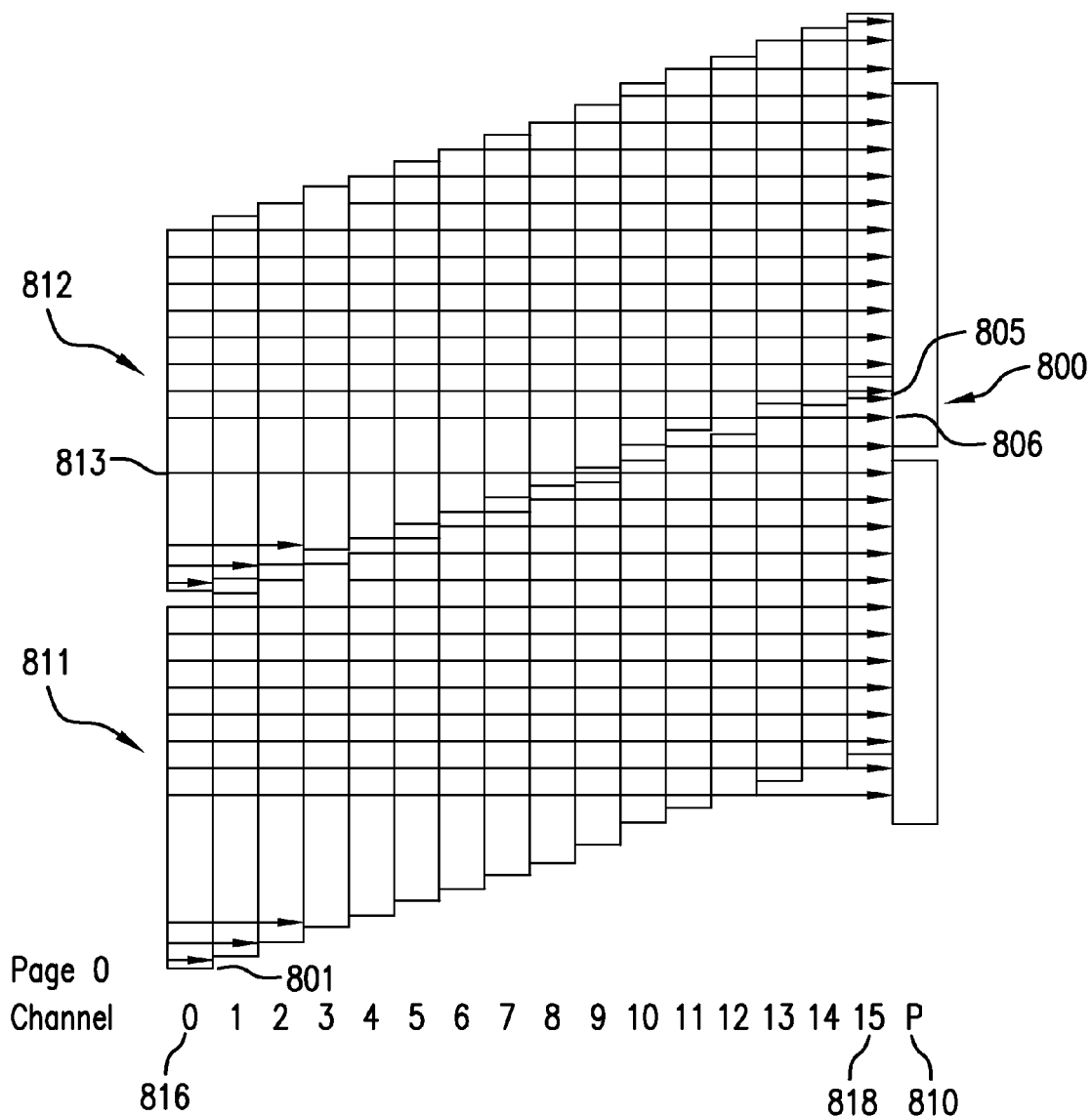
FIG. 8A is an alternative simplified channel offsetting chart illustrating exemplary data bands in accordance with an exemplary configuration of the present invention.

Stripes or data bands continue to progress across the entirety of the channels until a stripe set or data band 814 is reached and then, as successive stripe operations continue, less and less of the disks or channels 0, 1, 2, and the like are utilized in each successive stripe operation. This is due to the fact that each device or channel has a finite number of pages for each block and as the block 255 is reached, the flash device or disk can no longer be utilized. In an alternative embodiment, the channel, (in this case channel 0) which has ceased to be used as the last page (page 255) has been reached, may increment to a next block page 0 thereof as seen in FIG. 8A. An advantage of such an approach is that the initializing portion and write-out portion of the method (which utilizes less than the totality of the parallel devices) may instead be performed only once rather than once for every block.

Returning to FIG. 8, after the stripe set 814 has been written across all of the devices 0-15, the decreasing size of the selected stripe sets or data bands continues, culminating with a penultimate stripe set 806 which, as seen, utilizes perhaps a page 255 of channel 13 coupled with a page 254 of channel 14 and a page 253 of channel 15. Thereby, a high error portion 255 is coupled with a lower error chance portion page 254 and yet a lower portion 253 of channel 15. However, the parity portion in the parity device 810 is now (instead of being responsible for detecting and correcting errors spanning across 15 concurrent devices), instead only responsible for detecting and potentially correcting errors spanning across three devices.

Thereby, the collective error ratio or probability of likelihood of error is allocated more evenly, rather than a grouping solely of the highest page and a highest likelihood of error in one stripe set or data band being relegated to a fixed one size fits all cookie cutter parity portion. Instead, a fine balance is struck between a stripe or data band length and a probability of error occurring in the stripe length relative to a predetermined or predefined parity portion. An ultimate stripe 805 may include merely page 255 or the ultimate page of channel 15, and while this is the highest error portion, a very unreliable portion, potentially the error rate being an order of magnitude higher than the primary portions pages 0-n biased towards the bottom of channels 0-15, the parity portion delegated or dedicated to this stripe 805 essentially only needs to detect and correct errors in page 255 across only one channel, channel 15. Thereby, the parity portion for stripe 805 may essentially just be mirrored data, a 4 KB or less representation of the data stored in the page 255 of channel 15. Thereby, even if, statistically, the data in stripe 805 is corrupt, it is wholly recreated in the parity portion of device 810 for stripe 805.

In an alternative embodiment, seen in FIG. 8A, the other 14 channels 0-14 are utilized in combination with this ultimate page 255 of channel 15. However, channels 0-14, in the alternate embodiment belong to a succeeding block 812 and thereby, the high error rate of page 255 of channel 15 is now combined with much lower page numbers of the succeeding block 812 in channels 0-14. Thereby a balance or allocated likelihood of error is achieved and coupled with a suitable portion of parity data. Data band 813 illustrates a write across pages of one block 812 in channels 0-9 and writes across pages of a preceding block 811 in channels 10-15. Additionally, data band 805 and 806 are seen to span to succeeding blocks to thereby balance highly unreliable secondary portions of the first block from channels 14 and 15 with primary portions of the first block across all other channels 0-13.

In another alternative embodiment, the BCH, Bowes, Ray-Chaudhuri, and Hocquenghem (BCH) codes may be utilized for the error correcting code (ECC). One feature of the BCH codes is that the BCH codes may be selectively employed to ensure against a predetermined number of errors in the substantive data which they protect. For example, a certain robustness of BCH or ECC codes may be selectively employed with an eye towards the number of errors likely to occur in a stripe set or data band thereof. In other words, if a predetermined stripe set is likely to encounter three errors, for example, a selectively set robustness of the BCH or ECC codes may be chosen, not only to detect, but also to correct, at least three errors in the given stripe set. Thereby, the BCH or ECC codes may be suitably modulated as well as the length and likelihood of error. The collective likelihood of error in the selectively defined stripe set or data band may be suitably matched to arrive at an optimal level which allows for data resiliency and a minimization in data regeneration needed.

Figure 9:
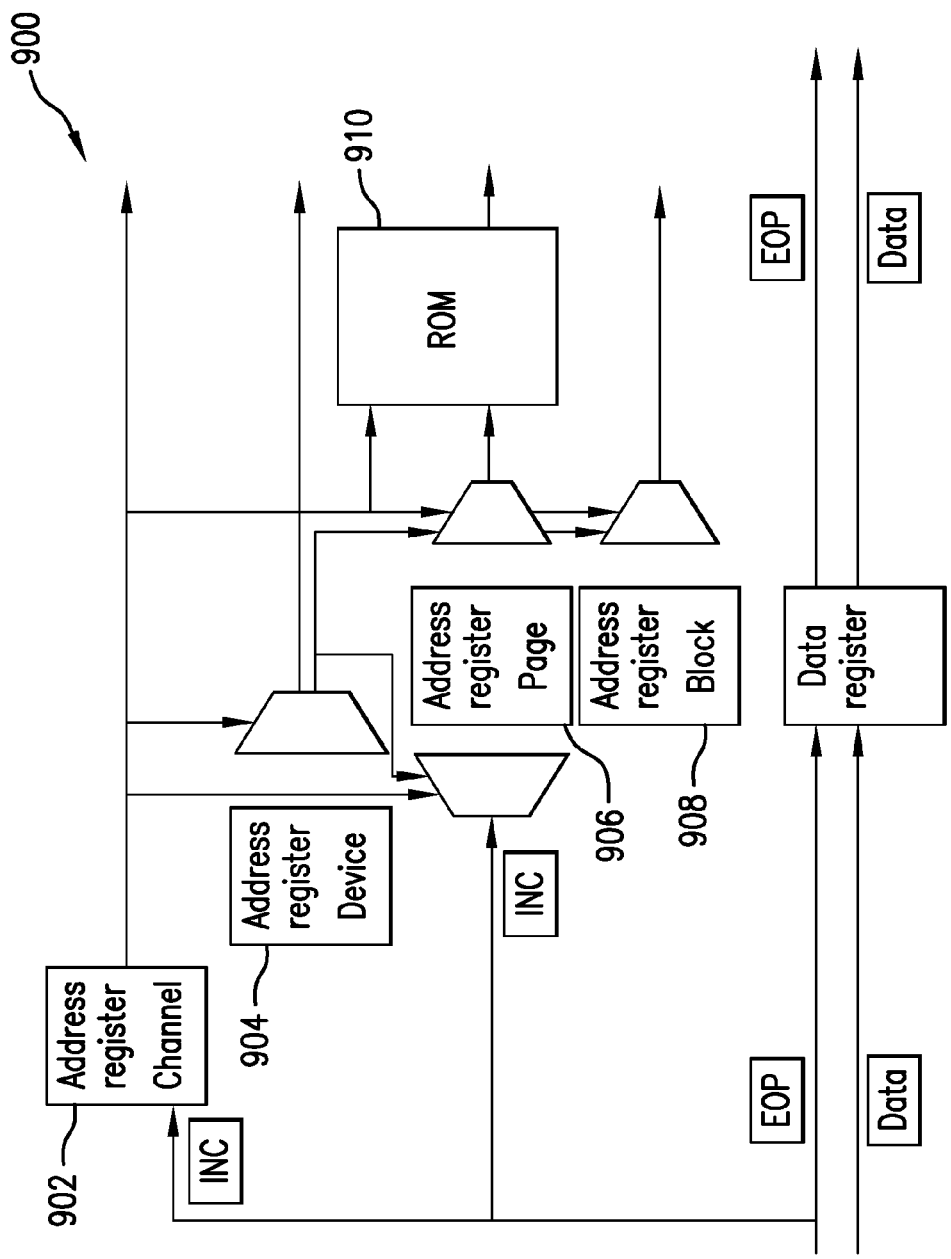
FIG. 9 is another block diagram illustrating an exemplary interconnection of components within a distribution controller in accordance with an exemplary configuration of the present invention; and, FIGS. 10A-10B are simplified write sequence charts illustrating exemplary writing orders.

As seen in FIG. 9, RAID controller 900 includes an address register 902 that receives incoming channel selection between 0 and n and address register 904 which receives a device selection on a channel, an address register 906 which receives a page address portion, and an address register 908 which receives a block portion. A ROM or firmware module 910 has a software-based implementation of the skewing/offsetting measures. Alternatively, an ASIC which involves a hardware implementation of the skewing or offsetting measures is implemented in a portion 910 thereof. Thereby, incoming packets are evaluated based upon their envelope and parameters stored therein. Upon considering the parameters stored in the envelope, the substantive data is passed out onto the addressed flash device and channel.

Figure 10A:
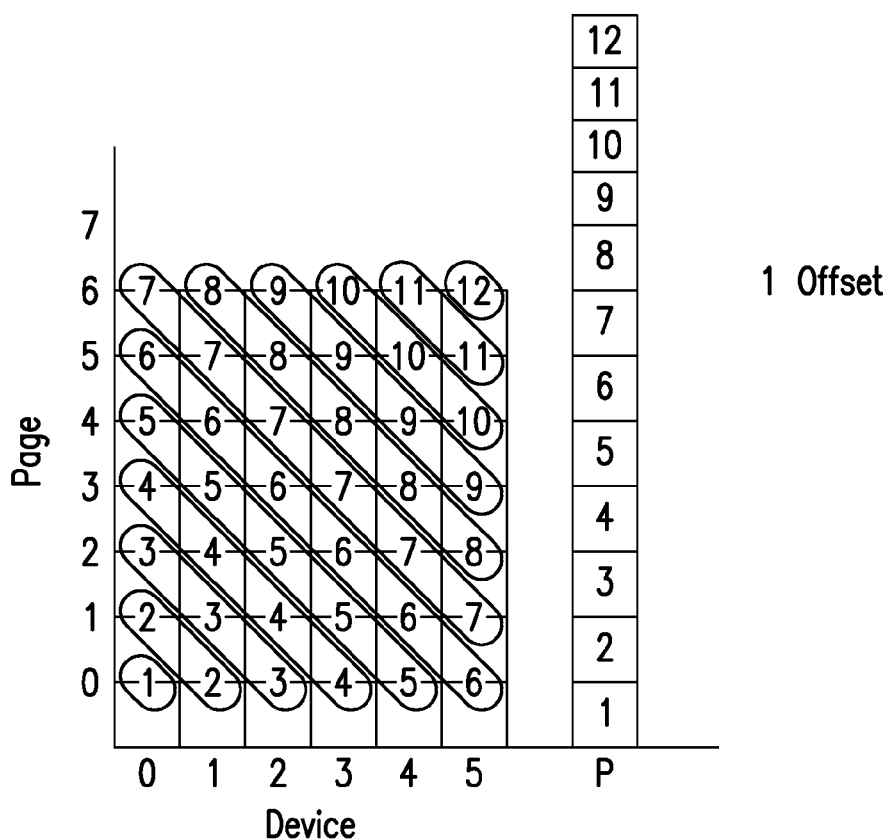

FIG. 10A illustrates an exemplary sequence of writes of a plurality of data bands written across pages and devices in a memory array utilizing a shift 1 offset. Device P illustrates parity data portions corresponding to numbered data bands thereof.

Figure 10B:
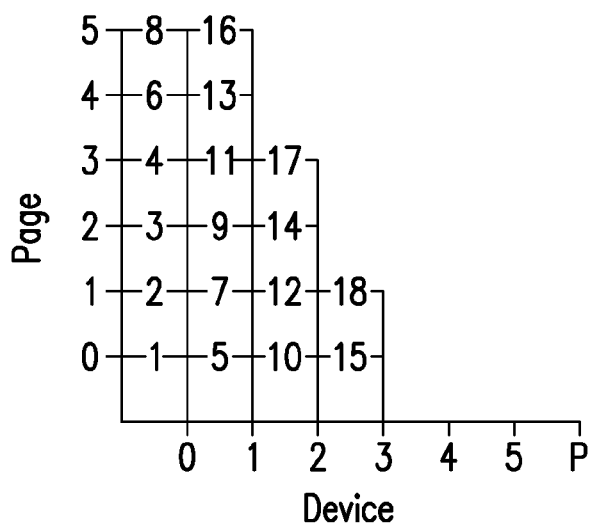

FIG. 10B illustrates another exemplary sequence of writes of data bands across pages and devices in a memory array. In FIG. 10B, a four shift approach is utilized in offsetting sequential writes between channels or devices. As seen, pages 0-4 of channel 0 are written before page 0 of channel 1. Thereby, an offset, or asymmetric utilization of devices in the memory array may be made to thereby separate primary portions into separate data bands, separate highly unreliable secondary pages into separate data bands, and thereby a collective error rate may be maintained below a set threshold or range of parity protection.

Although this invention has been described in connection with specific forms and configurations thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of circuit design and implementation of flows and processing steps may be reversed or interposed, all without departing from the spirit or scope of the invention as defined in the appended Claims.

What is claimed is:

1. A method for allocating data storage across a memory array having unevenly distributed regions of reliability, the method comprising:
   establishing a memory array defined by a plurality of storage channels each characterized by storage regions of varying data storage reliability disposed within each said storage channel;
   establishing a distribution controller coupled to said memory array for selectively assigning storage locations for a plurality of data bands to be stored in said memory array, each data band to be stored by one or more write operations; and,
   actuating said distribution controller to selectively allocate portions of each data band across a corresponding set of said storage channels, said distribution controller selectively assigning the set of said storage channels to maintain for each data band a collective error rate within a preselected range, the collective error rate being generated based on the data storage reliabilities of the storage regions for the data band portions to be stored, at least a first and a second of the data bands being thereby stored in different corresponding sets of storage channels.

2. The method as recited in claim 1 wherein each said storage channel includes a flash memory device defined by a plurality of pages, each said storage region thereof includes at least one page, and at least said first and said second data bands are stored across pages within the set of said storage channels corresponding thereto.

3. The method as recited in claim 2, wherein said first data band is stored across a different number of pages than said second data band.

4. The method as recited in claim 2, wherein corresponding portions of said first and second data bands are selectively distributed in storage regions of differing reliability responsive to said reliability.

5. The method as recited in claim 1, wherein at least one of said first and second data bands are stored on less than all storage channels of said memory array.

6. The method as recited in claim 1, wherein establishing a memory array includes establishing a redundant array of inexpensive disks (RAID) including a plurality of channels of flash devices arrayed therein and determining an error rate of storage regions of said channels of flash devices.

7. The method as recited in claim 6, wherein forming a data band includes asymmetrically selecting storage regions amongst said plurality of flash devices responsive to said determination of error rate, whereby said data bands are disparately distributed amongst said plurality of flash devices.

8. The method as recited in claim 7, wherein each said storage channel includes a plurality of sequentially writable pages including a primary page and a plurality of secondary pages, wherein said secondary pages have a higher error rate than said primary page.

9. The method as recited in claim 8, wherein asymmetrically selecting storage regions amongst said plurality of storage channels includes selecting not more than one primary page for each data band, to thereby selectively distribute primary pages amongst data bands.

10. The method as recited in claim 8, wherein asymmetrically selecting storage regions amongst said plurality of storage channels includes determining an unreliable secondary page of each of said storage channels and forming each said data band based upon said determination of unreliability to thereby selectively group storage pages of said storage channels for concurrent writing, whereby an unreliable page of one storage channel is grouped separately from unreliable portions of other storage channels.

11. The method as recited in claim 10, further comprising selectively generating a parity portion responsive to an evaluation of a predetermined combination of criteria selected from the group consisting of: a number of pages in a data band, a number of primary pages in a data band, and a number of unreliable pages in a data band.

12. The method as recited in claim 11, wherein said parity portion includes an error correcting code (ECC) and further comprising selectively grouping a plurality of data bands to said parity portion based upon their collective error rate, and writing said parity portion to said memory array.

13. A method for allocating data storage across a memory array having unevenly distributed regions of reliability, the method comprising:
   establishing a memory array defined by a plurality of storage channels each characterized by storage regions of varying data storage reliability disposed within each said storage channel;
   establishing a distribution controller coupled to said memory array for selectively assigning storage locations for a plurality of data bands to be stored in said memory array, each data band to be stored by one or more write operations; and, actuating said distribution controller to selectively allocate portions of each data band across a corresponding set of said storage channels, said distribution controller selectively assigning the set of said storage channels to maintain for each data band a collective error rate within a preselected range, the collective error rate being generated based on the data storage reliabilities of the storage regions for the data band portions to be stored, at least one of said data bands being thereby stored in at least a first and second storage region, the first storage region being in a first of said storage channels, the second storage region having a lesser reliability than the first region and being in a second of said storage channels.

14. The method as recited in claim 13, further comprising generating a parity portion based upon a corresponding data band and writing said parity portion to said memory array, whereby said parity portion is generated to have a preselected error correction threshold responsive to an evaluation of said corresponding data band therefor.

15. The method as recited in claim 14, wherein said establishing a memory array includes establishing a redundant array of inexpensive disks (RAID), said storage channels including a plurality of flash devices, each said flash device including a plurality of pages thereof, and further comprising determining an error rate of pages of said flash devices.

16. The method as recited in claim 15, further comprising asymmetrically selecting pages amongst said plurality of flash devices to form each data band, whereby said data bands are disparately distributed amongst said plurality of flash devices.

17. The method as recited in claim 16, wherein said pages of each flash device include a primary page and a plurality of secondary pages, wherein said secondary pages have a higher error rate than said primary page.

18. The method as recited in claim 17, wherein said asymmetrically selecting pages amongst said plurality of flash devices includes selecting not more than one primary page for each data band, to thereby selectively distribute primary pages amongst data bands.

19. The method as recited in claim 17, wherein said asymmetrically selecting pages amongst said plurality of flash devices includes determining an unreliable secondary page of each of said flash devices and forming each said data band based upon said determination of unreliability to thereby selectively group pages of said flash devices for concurrent writing thereto, whereby an unreliable portion of one flash device is grouped separately from unreliable portions of other flash devices.

20. The method as recited in claim 19, further comprising selectively setting an error correction configuration of the parity portion responsive to an evaluation of a predetermined combination of criteria selected from the group consisting of: a number of pages in said corresponding data band, a number of primary portions in said corresponding data band, and a number of unreliable portions in said corresponding data band.

21. A system for allocating data storage across a memory array having unevenly distributed regions of reliability, the system comprising:

a memory array defined by a plurality of storage channels each characterized by storage regions varying in data storage reliability within each said storage channel; and, a distribution controller coupled to said memory array, said distribution controller receiving data to be stored and selectively assigning storage locations for a plurality of data bands to be stored in said memory array, each data band to be stored by one or more write operations, each data band distributed across a corresponding set of storage channels, said distribution controller selectively distributing said data bands over said set of storage channels to maintain a collective error rate of each data band within a preselected range, the collective error rate being generated based on the data storage reliabilities of the storage regions for the data band portions to be stored, at least a first and a second of the data bands being thereby stored in different corresponding sets of storage devices.

22. The system as recited in claim 21, wherein said memory array includes a redundant array of inexpensive disks (RAID) including a plurality of flash devices arrayed therein, each said flash device having a plurality of storage regions thereof, wherein each said storage region includes a plurality of sequentially writable pages including a primary page and a plurality of secondary pages.

23. The system as recited in claim 22, wherein said distribution controller includes a data split module including a multiplexor selectively sending data portions of each data band to a respective flash device.

24. The system as recited in claim 23, wherein said distribution controller includes a data combination module selectively retrieving data from said memory array according to said data bands.

25. A system for allocating data storage across a memory array having unevenly distributed regions of reliability, the system comprising:

a memory array defined by a plurality of storage channels each characterized by storage regions varying in data storage reliability within each said storage channel; and, a distribution controller coupled to said memory array, said distribution controller receiving data to be stored and selectively assigning storage locations for a plurality of data bands to be stored in said memory array, each data band to be stored by one or more write operations, each data band distributed across a corresponding set of storage channels, said distribution controller selectively distributing said data bands over said set of storage channels to maintain a collective error rate of each data band within a preselected range, the collective error rate being generated based on the data storage reliabilities of the storage regions for the data band portions to be stored, at least one of said data bands being thereby stored in at least a first and second storage region, the first storage region being in a first of said storage channels, the second storage region having a lesser reliability than the first region and being in a second of said storage channels.

26. The system as recited in claim 25, wherein said memory array includes a redundant array of inexpensive disks (RAID) including a plurality of flash devices arrayed therein, each said flash device having a plurality of storage regions thereof, wherein each said storage region includes a plurality of sequentially writable pages including a primary page and a plurality of secondary pages.

27. The system as recited in claim 26, wherein said distribution controller includes a data split module including a multiplexor selectively sending data portions of each data band to a respective flash device.

28. The system as recited in claim 27, wherein said distribution controller includes a data combination module selectively retrieving data from said memory array according to said data bands.

\* \* \* \* \*